United States Patent [19]

Minai

[11] Patent Number: 5,685,610
[45] Date of Patent: Nov. 11, 1997

[54] RECLINING DEVICE FOR SEAT

[75] Inventor: Masamitsu Minai, Akishima, Japan

[73] Assignee: Tachi-S Co., Ltd., Tokyo, Japan

[21] Appl. No.: 629,399

[22] Filed: Apr. 8, 1996

[51] Int. Cl.$^6$ .................. B60N 2/02; B60N 2/22
[52] U.S. Cl. .............. 297/364; 297/367; 297/369
[58] Field of Search .................. 297/363, 364, 297/365, 367, 369

[56] References Cited

U.S. PATENT DOCUMENTS

| | | | |
|---|---|---|---|
| 4,504,091 | 3/1985 | Ohshiro | 297/369 |
| 5,161,856 | 11/1992 | Nishino . | |
| 5,234,255 | 8/1993 | Kawakita . | |
| 5,299,818 | 4/1994 | Newbold | 297/363 |
| 5,516,198 | 5/1996 | Yokoyama | 297/364 |
| 5,524,970 | 6/1996 | Klenke et al. | 297/365 |

FOREIGN PATENT DOCUMENTS

| | | |
|---|---|---|
| 486758 | 5/1975 | Australia . |
| 3509855 | 10/1986 | Germany . |

*Primary Examiner*—Peter M. Cuomo
*Assistant Examiner*—Anthony D. Barfield
*Attorney, Agent, or Firm*—Browdy & Neimark

[57] ABSTRACT

A reclining device for seat which has circular inwardly and outwardly toothed portions as a full meshing lock element, which permits for reducing pitches in the teeth of them for fine adjustment of reclining angle. A male lock member having the circular outwardly toothed portion and a female lock plate having the circular inwardly toothed portion are provided coaxially on a shaft. The male lock member is so accommodated in a base housing as to be movable along the longitudinal axis of the shaft in an irrotational way via a guide element. A rotary cam member and an array of cam follower regions are provided as an actuation element, which works with the guide element to insure stable positioning and displacement of the male lock member relative to the female lock plate. Hence, the arcuate outwardly toothed protion may be positively brought to and out of meshed engagement with the arcuate inwardly toothed portion, without any incomplete unlocking problem.

14 Claims, 4 Drawing Sheets

RECLINING DEVICE FOR SEAT

BACKGROUND OF INVENTION

1. Field of the Invention

The present invention relates to a reclining device for use in a seat, which is operable to adjust the angle of inclination of a seat back with respect to a seat cushion of the seat.

2. Description of Prior Art

In most of ordinary reclining device used in a seat, an upper arm is rotatably connected to a lower base arm via a locking mechanism, so that a seat back fixed to the upper arm may be adjustably inclined with respect to the a seat cushion fixed on the lower base arm, by operation of the locking mechanism.

The locking mechanism in the reclining device is normally of such a construction that an outwardly toothed portion of a movable lock gear member may be moved, using an operation lever, in a direction to a selected part of an arcuate inwardly toothed portion so as to determine a desired reclining angle of a seat back in respect to a seat cushion.

However, in this conventional reclining device, such movable lock gear member has an outwardly toothed which is quite small in area in relation to the long arcuate inwardly toothed portion as such, a great load or force applied to the seat back is transmitted intensively to the very limited engagement point between the lock gear member and arcuate inwardly toothed portion. As a result, the outwardly toothed portion of lock gear member requires a great strength, usually achieved by increasing a thickness in each of its gear teeth. This requires a substantial increase of thickness of all gear teeth, which leads to enlargement of the dimensions and weight of reclining device. In other words, the reclining device will take more room for installation in the seat, thus impairing the outer appearance and cushioning effect of seat. The increase of thickness of gear teeth itself results in the increase of pitch in each of teeth, preventing fine adjustment of the reclining angle of the seat back relative to the seat cushion. On the other hand, to achieve fine adjustment of the reclining angle, one can form a circular outwardly toothed portion in the lock gear member with respect to the arcuate inwardly toothed portion so as to increase the area for meshed engagement between outwardly and inwardly toothed portions in an attempt to not only increase the strength of reclining device, but also permit making tooth pitch smaller to permit adjustment of the reclining angle. Even in that case, however, it is of a high likelihood that a poor meshed engagement will easily occur between the two circular or arcuate tooth portions, and also, a difficulty will arise in determining a precise position of the circular or arcuate male toothed portion relative to the mating circular or arcuate female toothed portion during assemblage of reclining device. This will further give rise to an undesired incomplete unlocking or "half-locked" problem in the unlocking operation of reclining device.

SUMMARY OF THE INVENTION

In view of the above-stated drawbacks, it is a primary purpose of the present invention to provide an improved reclining device for a seat which insures positive locking/unlocking action without the incomplete unlocking problem of the prior art. The invention also permits a fine adjustment of reclining angle, while maintaining a small-sized structure.

In order to achieve such purpose, in accordance with the present invention, there is basically provided a reclining device which comprises:

a shaft;

a base housing through which the shaft is rotatably inserted;

a female lock plate so supported on the shaft as to be rotatable with respect to the base housing, the female lock plate having an inwardly toothed portion of a generally circular configuration formed therein relative to a central axis of the shaft;

a male lock means having, formed in one side thereof, an outwardly toothed portion of a generally circular configuration for a full meshed engagement with the inwardly toothed portion of female lock plate, the male lock means being so provided on the shaft as to be rotatable thereabout and movable in a longitudinal direction thereof;

a guide means defined between the base housing and another side of male lock means, the guide means being for guiding the male lock means in an non-rotational way in a direction towards and away from the female lock plate;

an operation lever integrally connected to the shaft; and an actuation means for causing the male lock means to move in the longitudinal direction of the shaft via the guide means so as to bring the outwardly toothed portion to and out of meshed engagement with the inwardly toothed portion, the actuation means including:

a cam means engaged to the shaft as to be rotatable together therewith;

a cam follower means another side of the male lock means, the cam follower means having an region and disengagement region respect to the cam means; and a biasing means for biasing the male lock means away from the male lock plate.

Accordingly, in view of the circular meshed engagement between the outwardly and inwardly toothed portions and the constituent elements being collectively provided about the shaft, the whole structure of reclining device can be reduced in size, while making the pitch between each tooth of the two toothed portions in a manner to permit fine adjustment of the reclining angle of a seat back relative to a seat cushion in the seat. Further, by virtue of the guide and actuation means, the male lock means may be easily positioned relative to the female lock plate in assemblage, and an error-free engagement and disengagement between the inwardly and outwardly toothed portions is attained in operation.

The guide means may comprise at least one protuberant guide portion formed in the foregoing another side of male lock means, and at least one guide recession formed in the base housing, such that the protuberant guide portion is so slidably fitted in the guide recession as to permit non-rotational movement of the male lock means along the longitudinal direction of the shaft in a direction towards and away from the female lock plate.

The cam means may have a plurality of projected cam surfaces disposed apart from one another at a predetermined interval relative to the shaft, and the cam follower means may comprise an array of cam follower regions which are defined by forming a plurality of the engagement regions and a plurality of the disengagement regions in an alternating relation with one another relative to the shaft.

Each of the projected cam surfaces may be formed with at least one sloped surface, and each of the foregoing engagement regions may also be formed with at least one sloped surface, so as to facilitate the ease with which the projected cam surfaces are engaged and disengaged from the respective engagement regions.

Between each of the projected cam surfaces and each of the engagement regions, there may be provided a sheer portion for allowing abrupt sliding of each projected cam surface along the respective engagement regions, so as to insure that the inwardly toothed portion is brought completely out of the meshed engagement with the outwardly toothed portion.

As one exemplary mode, the projected cam surfaces may comprise three projected cam surfaces which are formed apart from one another at 120-degree interval relative to the shaft, and the engagement regions may comprise three cam enagement recessions which are formed at 120-degree interval from one another. Also, the cam disengagement regions may comprise three coplanar cam disengagement platforms, each alternating with the respective three cam engagement recessions. Or, the projected cam surfaces may comprise four projected cam surfaces formed apart from one another at a 90-degree interval relative to the shaft, and the engagement regions may comprise four cam engagement recessions formed at 90-degree interval from one another, with the cam disengagement regions comprising four coplanar cam disengagement platforms, each alternating with the respective said four cam engagement recessions.

Other features and advantages of the present invention will become apparent from reading of the descriptions hereinafter, with reference to the annexed drawings.

BRIEF DESCRIPTION OF THE DRAWINGS

FIG. 1

and

DETAILED DESCRIPTION OF PREFERRED EMBODIMENTS OF THE INVENTION

Referring to FIGS. 1 through 8, there are shown preferred modes of reclining device constructions, by way of examples, in accordance with the present invention.

Figure 1:
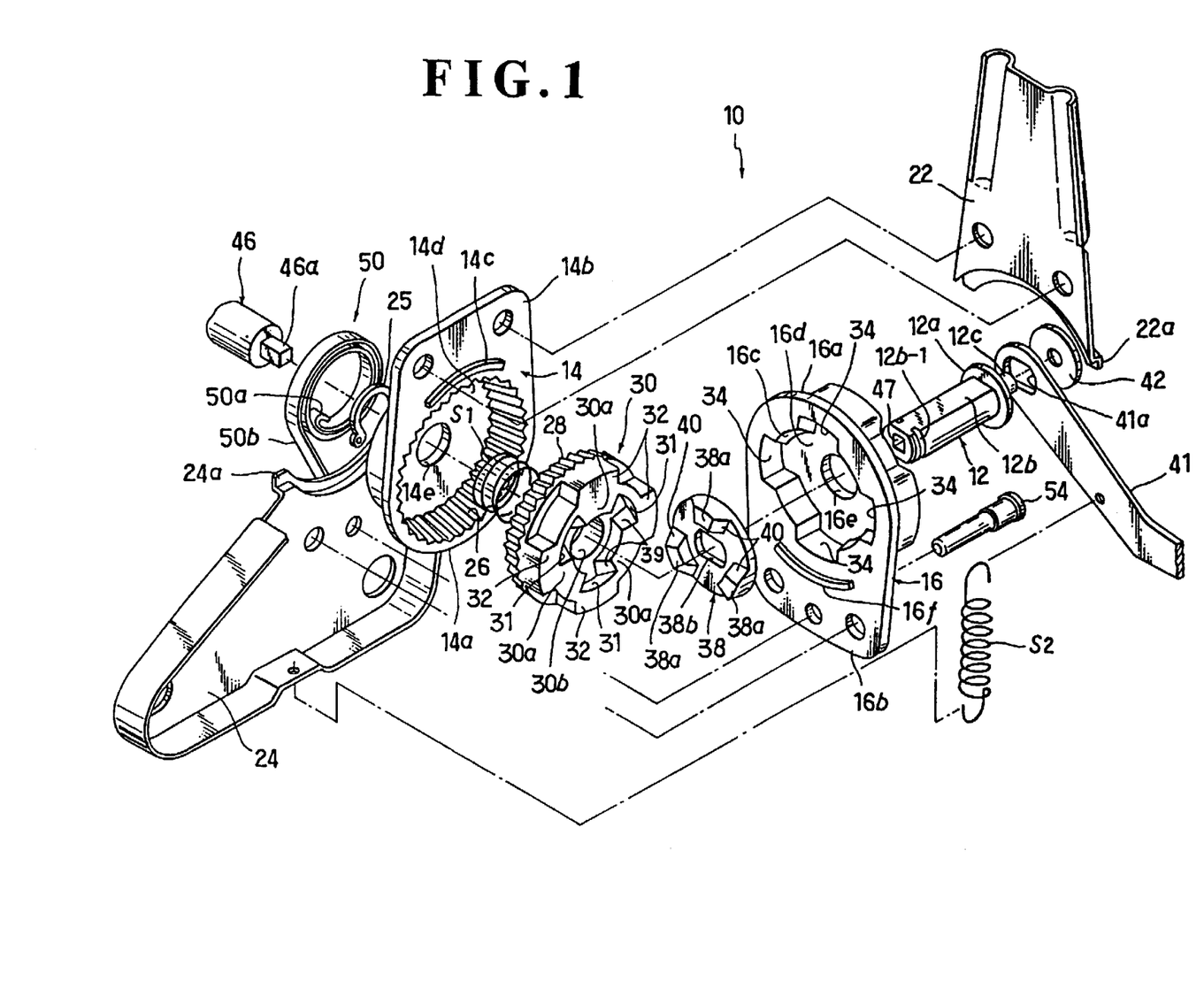
FIG. 1 is an exploded schematic perspective view of one mode of reclining device for seat in accordance with the present invention.
Figure 7:
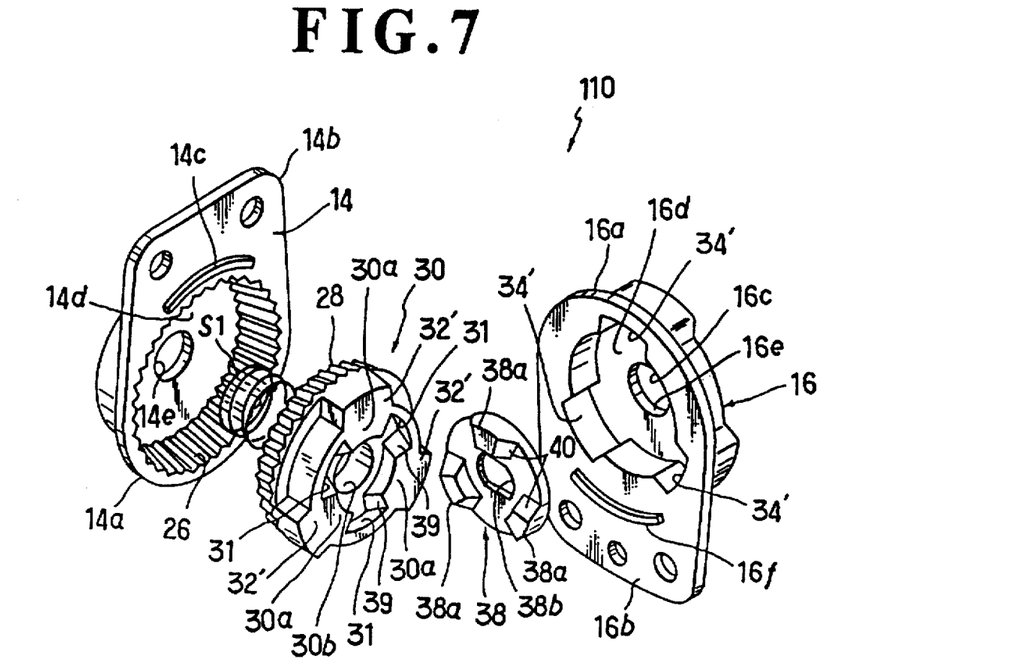
FIG. 7 is an exploded schematic perspective view of a principal part of another alternative mode of the reclining device.
Figure 8:
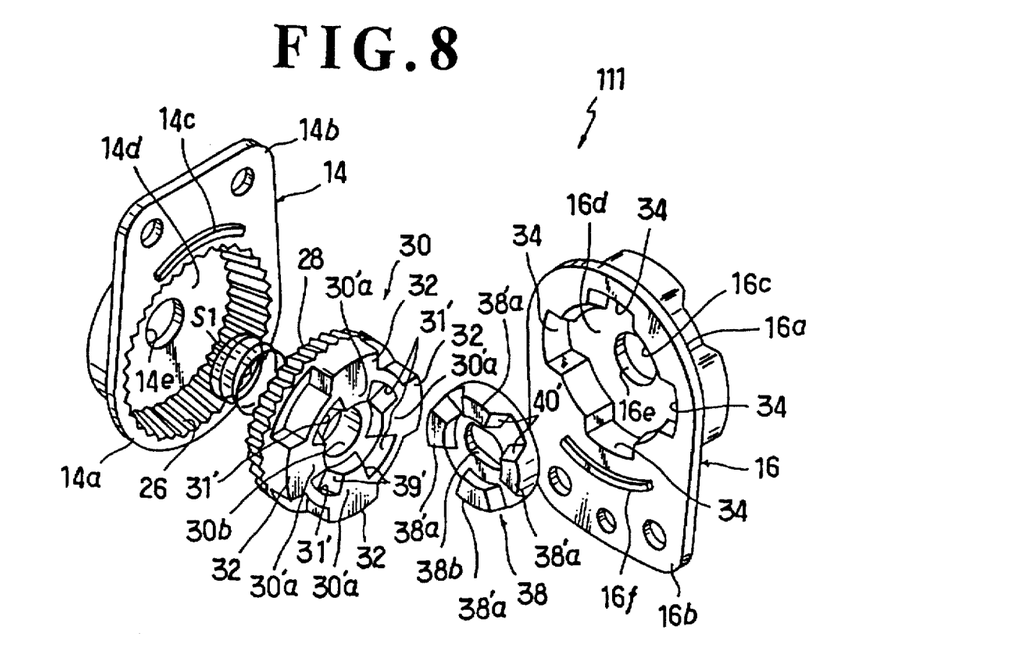
FIG. 8 is an exploded schematic perspective view of a principal part of still another alternative mode of the reclining device.

FIG. 1 shows a whole structure of the reclining device employed in the present invention, which is a common basic arrangement for all the modes, namely, a first mode (10) shown in FIGS. 1 to 4, an alternative second mode (110) shown in FIG. 7, and an alternative third mode (111) shown in FIG. 8. The second and third modes (110)(111) are exemplary alterations in design for guide and actuation means of male lock member on the basis of such basic common structure, as will become apparent hereinafter.

All through those three embodiments, there are provided, in common:

(i) a rotatable female lock plate (14) having a circular inwardly toothed portion (26);

(ii) a base housing (16) stationary relative to the rotatable female lock plate (14);

(iii) a male lock member (30) having a circular outwardly toothed portion (28);

(vi) a plurality of protuberant guide portions (e.g. 32 or 32') formed on the male lock member and a plurality of guide recessions (e.g. 34 or 34') formed in the base housing (16), which constitute a guide means for non-rotational slide guiding of the male lock member (30) with respect to the female lock plate (14); and (v) a rotary cam member (38) connected via a shaft (12) to an operation lever (41) and an annular array of uneven cam follower regions (e.g. 30a and 31 or 30'a and 31') formed on the male lock member (30), which constitute an actuation means for bringing the male lock member to and out of a meshed engagement with the female lock plate (14).

Now, turning to view of FIG. 1, specifically stated, the female lock plate (14) is so formed to have the foregoing circular inwardly toothed portion (26), an upper plate area (14b) and a lower arcuate edge (14a). The female lock plate (14) has a hole (14e) perforated therein, through which hole (14e), the shaft (12) is inserted. The circular inwardly toothed portion (26) is formed along a circle having a center at that hole (14e) and in a frusto-conical fashion which opens divergently from an offset side wall (14d) to a coplanar plane with the inward planar surface of the upper plate area (14b). Thus, the female lock plate (14) has a frusto-conical projected portion defined at the outward side opposite to the inward side forming such frusto-conical inwardly toothed portion (26). The lower arcuate edge (14a) is also contoured along a circle having a center at the hole (14e). Designation (14c) denotes an arcuate guide projection which is formed opposite to the lower arcuate edge (14a) and along the circumference of the same circle along which the lower arcuate edge (14a) is formed.

The base housing (16) is shown to have a generally similar configuration to that of the above-stated female lock plate (14), having a circular recessed room (16c), an upper arcuate edge (16a) and a lower plate area (16b). A bearing hole (16e) is perforated in the outwardly projecting wall (16d) of the housing (16). In the bearing hole (16e), the shaft (12) is rotatably supported. The circular recessed room (16c) is formed along a circle having a center at that hole (16e). The upper arcuate edge (16a) is also contoured along a circle having a center at the hole (16e). Designation (16f) denotes an arcuate guide projection which is formed opposite to the upper arcuate edge (16a) and along the circumference of the same circle along which the upper arcuate edge (16a) is formed. According to the first mode (10), this base housing (16) is formed with four guide recessions (34) about the peripheral wall of circular recessed room (16c). As shown, the four guide recessions (34) are disposed apart from one another with 90-degree interval relative to the hole (16e) and extend outwardly from the circle along which the peripheral circular recessed room (16c) is defined.

Figure 2:
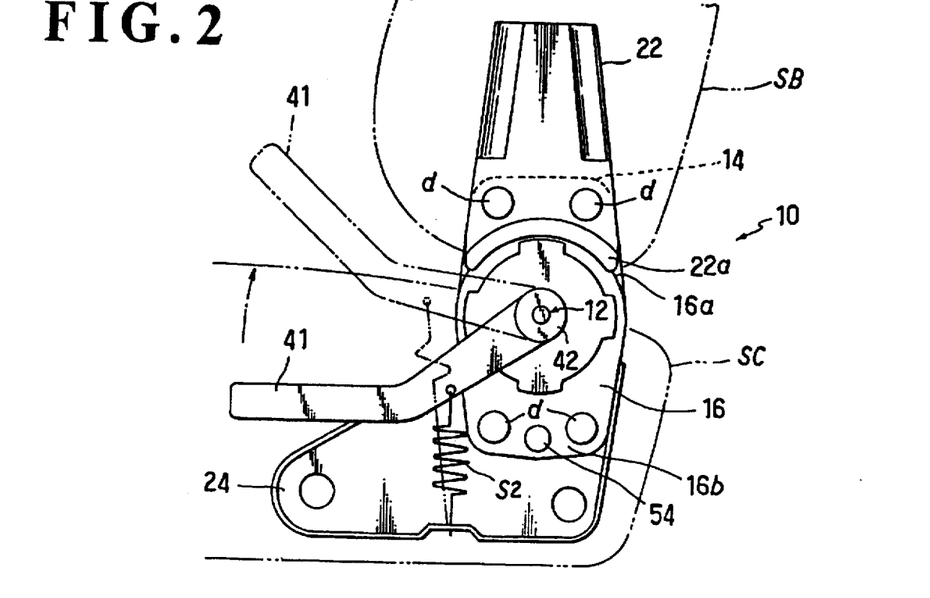
FIG. 2 is a schematic front view of the reclining device of FIG. 1.
Figure 3:
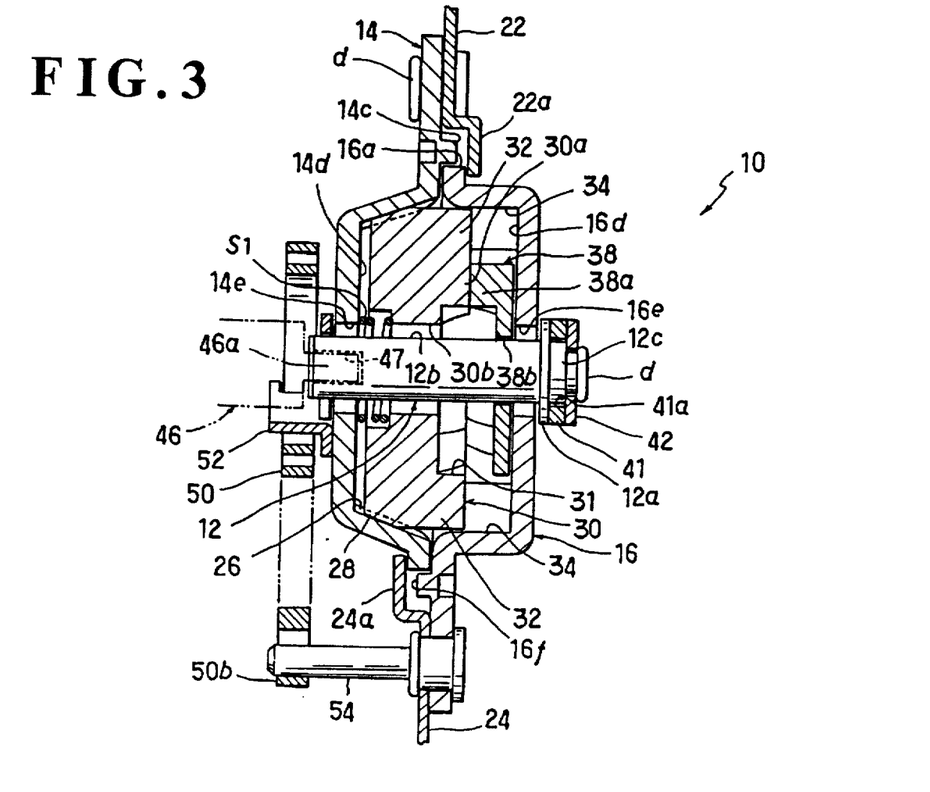
FIG. 3 is a partly broken, schematic longitudinally sectional view of the reclining device.

As can be seen from FIGS. 1, 2 and 3, an arm plate (22) is connected via caulking (d) to the upper plate area (14b)

female lock plate (14), and a base plate (24) is connected likewise via caulking (d) to the lower plate area (16b) of base housing (16). As indicated by the two-dot chain line in FIG. 2, the arm and base plates (22)(24) are to be fixed to seat back (SB) and seat cushion (SC), respectively.

The shaft (12) has a non-circular long section (12b) having, defined therein, a pair of flat opposite surfaces and a pair of arcuate opposite surfaces, as illustrated. The two arcuate opposite surfaces are defined along a circle, the diameter of which is slightly smaller than that of both holes (14e)(16e) respectively of the female lock plate (14) and housing (16), so that the shaft (12) is inserted and supported rotatably in both of them. Also, the shaft (12) has a circular flange (12a), and one connecting end portion (12c). This one connecting end portion (12c) has the same non-circular shape as the non-circular long section (12b). The long non-circular long section (12b) of shaft (12) terminates in an end having a square bore (47) formed in the extremity thereof and two arcuate notches (2a-1) formed in the respective two arcuate surfaces thereof.

According to the present first mode (10), the male lock member (30) is basically of a disc-like shape having the circular outwardly toothed portion (28) formed on one side, and further having the four protuberant guide portions (32) formed on another opposite side. The male lock member (30) also has a circular hole (30b) perforated centrally thereof But, strictly stated, that outwardly toothed portion (28) is formed along a circle having a center at that hole (30b) in a bevel gear shape such as to be mesh engageable with the aforementioned frusto-conical inwardly toothed portion (26) of female lock plate (14). In this respect, it is to be understood that the male lock member (30) and female lock plate (14) have convergent and divergent frusto-conical toothed portions (28)(26), respectively, in their mutually opposed relation in respect to an axis extending through their respective concentric holes (30b)(14e), for slidable engagement and disengagement therebetween.

The male lock member (30) has four protuberant guide portions (32) formed on an opposite side thereof to the side forming the above-described outwardly toothed portion (28), such that those four guide portions (32) are disposed at 90-degree equidistant interval from one another, extending outwardly and radially relative to the hole (30b) within the circumference range of whole circular contour of male lock member body (30). The four guide portions (32) are equal in height to one another, and the thus-formed side of male lock member (30) generally conforms in contour to the foregoing recessions (16c)(34) of base housing (16), whereby those four guide portions (32) are slidably accommodated in the four guide recessions (34) of housing (16), respectively. Accordingly, the guide means in this mode (10) comprises four guide portions (32) and mating four guide recessions (34), by means of which, in assemblage, the male lock member (30) may be set in a predetermined position within the base housing (16) so that the female lock plate (14) may be easily assembled to the housing (16), with the inwardly toothed portion (26) thereof being fit meshed with the outwardly toothed portion (28) of male lock member (30), and further, in operation, the male lock member (30) may be stably guided in an irrotational manner along the longitudinal axis of shaft (12) for error-free engagement and disengagement between the outwardly and inwardly toothed portions (28)(26).

In this particular mode, three cam engagement recessions (31) are further formed on such another opposite side of the male lock member (30), such that they are disposed apart from one another with 120-degree equidistant interval relative to the hole (30b), and also equal in depth to one another. This formation of cam engagement recessions (31) in turn creates three equidistantly spaced-apart cam disengagement platforms (30a), each alternating with the recessions (31), to thereby define an annular array of six uniformly undulated cam follower regions with respect to the rotary cam member (38). Hence, the counterpart rotary cam member (38) is provided, which has three projected cam surfaces (38a) formed apart from one another with 120-degree interval relative to a central axis of the non-circular hole (38b) thereof, so that each of these three spaced-apart projected cam surfaces (38a) may be engaged into the respective three cam engagement recessions (31), or may be ridden upon the respective three cam disengagement platforms (30a), through rotation of the cam member (38). Otherwise stated, the three cam surfaces (38a) are rotatable and slidable along the annular array of six uneven cam follower surfaces (30a)(31) relative to the common centers of both holes (38b)(30b), thereby constituting the principal actuation means in this mode (10).

Designation (S1) denotes a compression spring which is provided between the male lock member (30) and female lock plate (14), in order to bias the former (30) away from the latter (14), thereby normally attempting to cause disengagement of the outwardly toothed portion (28) from the inwardly toothed portion (26). Thus, the spring (S1) forms one of the actuation means.

With the construction thus described, the long section (12b) of the shaft (12) is inserted through all the holes (16e) (38b)(30b)(14e) as indicated in FIG. 1, so that both rotary cam member (38) and guide portions (32) of male lock member (30) are accommodated coaxially within the recessions (16c)(34) of housing (16) via the shaft (12), while the converging outwardly toothed portion (28) of male lock member (30) is in mesh with the diverging outwardly toothed portion (26). At the same time, the three projected cam surfaces (38a) of rotary cam member (38) should be initially engaged in the respective three cam engagement recessions (31) of male lock member (30), and further, the compression spring (S1) be interposed between the male lock member (30) and female lock plate (14), while being wound around the non-circular long section (12b) of shaft (12). Consequently, as understandable from FIG. 3, the lower circular area (i.e. at the frusto-conical inwardly toothed portion (26)) of the female lock plate (14) is coaxially juxtaposed with the upper circular area i.e. at the recessions (16c)(34) of the housing (16), such that the arcuate guide projection (14c) of female lock plate (14) is in a slidable contact on the upper arcuate edge (16a) of housing (16), whereas on the other hand, the arcuate guide projection (16f) of base housing (16) is in a slidable contact on the lower arcuate edge (14a). Then, a C-shaped securing ring (25) is attached firmly in the two notches (12b-1) of shaft (12), with the circular flange portion (12a) of shaft (12) being abutted upon the outward surface of housing (16). Further, the operation lever (41) is connected to the non-circular extreme end part (12c) of shaft (12) by fitting the non-circular hole (41a) of operation lever (41) about that extreme end part (12c) of shaft (12). A securing ring (42) is fixed to the same extreme end part (12c) of shaft (12) via a caulking (d) (see FIG. 3), to thereby prevent removal of the operation lever (41) from the shaft (12). With this arrangement, it is seen that the rotary cam member (38), by the reason of its non-circular hole (38b) being fitted about the same non-circular shaft (12), is only prevented against rotation about the shaft (12) and thus integrally connected thereto, and therefore, vertical rotation of the operation lever (41) causes simultaneous rotation of the rotary cam member (38) within the housing (16). It is also seen that the male lock member (30) is slidable along the longitudinal axis of shaft (16), and that the female lock plate (14) is stably rotatable about the two arcuate lateral surfaces of non-circular shaft (16) with respect to the housing (16) by way of the circumferential supportive guiding of upper and lower concentric arcuate guide portions (14c)(16f).

A spiral spring (50) is provided to give a bias force to the female lock plate (14), so that the seat back (SB) fixed to the male lock plate (14) is biased to a normal home position. As can be seen in FIG. 3, the spiral spring (50) is secured at its one base end (50a) to a securing lug (52) fixed on the female lock plate (14) and at its one free end (50b) secured to a securing pin (54).

A biasing spring (S2) is extended between the operation lever (41) and base plate (24) so as to bias the operation lever (41) towards a non-use horizontal position, as shown by the solid line in FIG. 2. The biasing spring (S2) also forms one of the actuation means, as will be understood later.

If required, a connecting rod (46) may be provided, which has a square end (46a) to be fitted into the square hole (47) of shaft (12), so that the connecting rod (46) may be connected to the shaft (12) for synchronized operation with another reclining device, as applied to a dual-type reclining device.

In accordance with the present invention, the three cam engagement recessions (31) are each so tapered inwardly of the male lock member (30) as to define a pair of outwardly divergent sloped side walls (39)(39) therein, and further, the three projected cam surfaces (38a) are each so tapered outwardly of the rotary cam member (38) as to define a pair of outwardly convergent sloped side walls (40)(40) therein. This sloping of paired side walls in each of the cam surface (38) and cam engagement recession (31) is essential for permitting all the projected cam surfaces (38a) to smoothly disengage from the respective cam engagement recessions (39) and ride on the respective cam disengagement platforms (30a).

Figures 5, 6:
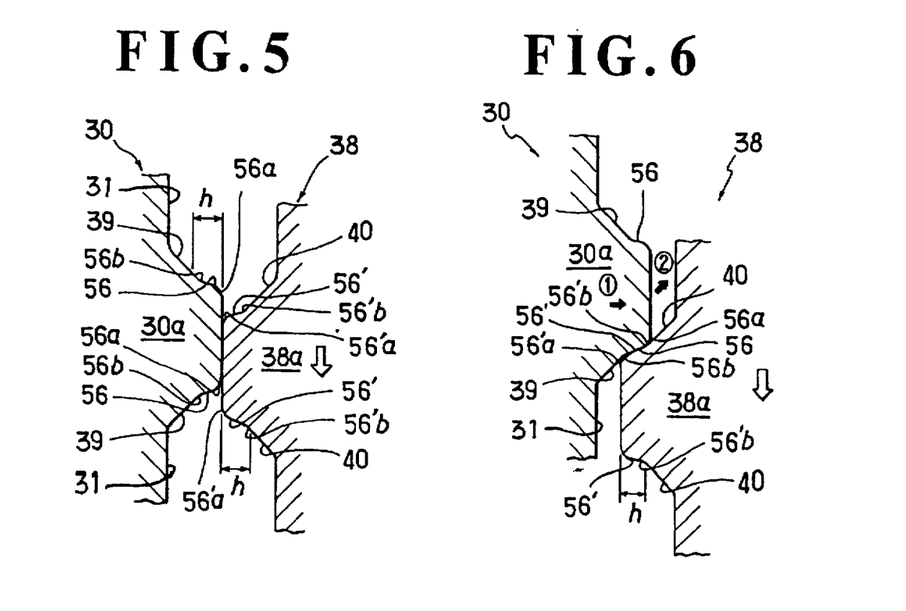
FIG. 5 is a schematic diagram for explanatorily showing a disengaged state between a rotary cam member and an array of cam follower regions; of FIG.
FIG. 6 is a schematic diagram for showing an abrupt engaging action between the rotary cam member and array of cam follower regions; of FIG.

Moreover, in accordance with the invention, as can be seen from FIGS. 5 and 6, the two sloped side surfaces (40)(40) of each projected cam surface (38a) are respectively formed with two upper sheer areas (56)(56) extending at a generally right angle from the upper summit cam surface thereof. Likewise, the two sloped side surfaces (39)(39) of each cam engagement recession (31) are respectively formed with two upper sheer areas (56')(56) which extend at a generally right angle from the upper summit cam surface thereof. As indicated by the designations (h), in both of those projected cam surface (38) and cam engagement recession (31), their respective sheer areas (56)(56') are equal in length (h) to each other. The provision of such sheer areas (56)(56') serves as a means for causing an abrupt and quick disengagement of the outwardly toothed portion (28) from the inwardly toothed portion (26) to avoid an incomplete unlocking (half locked) problem occurring therebetween, as will be more understood later. In addition, each corner (56a) between the cam engagement recession (31) and cam disengagement platform (30a) is formed round, and likewise, both upper corners (56'a)(56'a) of each projected cam surface (38a) are formed round, to thereby provide smooth corners. Also, the boundary (56b or 56'b) between the sheer area (56 or 56') and sloped side surface (39 or 40) is gently curved to provide a smooth continuous sloped surface. Those smooth surfacing designs are advantageously effective in facilitating the ease with which the three projected cam surfaces (38a) are rotated and slid along the annular array of uneven six cam follower surfaces (30a)(31) relative to the central axis of the shaft (16).

Figure 4:
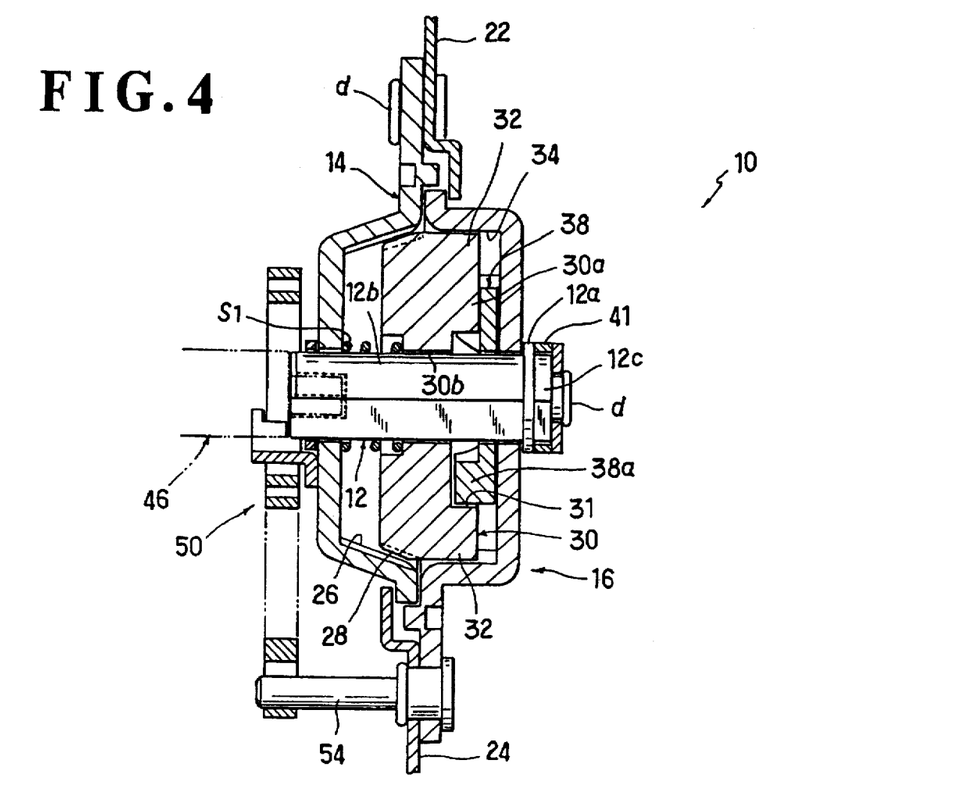
FIG. 4 is a partly broken, schematic longitudinally sectional view of the reclining device, FIG. 1 showing the unlocked state thereof.

Accordingly, when not in use, as can be seen in FIGS. 2 and 3, the operation lever (41) is retained in the generally horizontal non-use position under the biasing force of the biasing spring (S2), which in turn retains the rotary cam member (32) in such locking state where the three projected cam surfaces (38a) rest upon the respective cam disengagement platforms (30a) to thereby press the male lock member (30) in a direction wherein the convergent frusto-conical outwardly toothed portion (28) of male lock member (30) is in a full mesh with the divergent frusto-conical inwardly toothed portion (26) of female lock plate (14), overcoming the counter biasing force of compression spring (S1). Conversely, when it is desired to adjust the reclining angle of seat back (SB) with respect to the seat cushion (SC), the operation lever (41) is raised as indicated by the arrow in FIG. 2 against the downward biasing force of spring (S2), which causes the rotary cam member (38) to rotate clockwise about the shaft (12), as viewed from FIG. 1, thereby displacing the three projected cam surfaces (30a) from the respective three cam disengagement platforms (30a) towards the respective adjoining cam engagement recessions (31), with the result that each of the three projected cam surfaces (38a) is about to slide along the respective sloped side walls (39) downwards to the bottom each of the corresponding three cam engagement recessions (31). More specifically, as understandable from FIGS. 5 and 6, with such rotation of rotary cam member (38), each projected cam surface (38a) is slid horizontally along the flat surface of mating cam disengagement platform (30a), as indicated by the white arrow in FIG. 6, and then, upon the cam surface (38a) having passed from the cam disengagement platform (30a), the male lock member (30) is caused by the biasing force of the compression spring (12) to abruptly displace a little away from the female lock plate (14) along the longitudinal axis of shaft (12), as indicated by the arrow as shown in FIG. 6, namely in a perpendicular direction relative to the first horizontal sliding direction of cam surface (38a). This is due to the fact that the sheer area (56) of cam disengagement recession (31) is abruptly slid rectilinearly along the sheer area (56') of cam surface (38a) by a distance corresponding to the length (h) of both sheer areas (56)(56'). Consequently, the outwardly toothed portion (28) of lock cam member (30) is quickly and positively brought out of meshed engagement with the inwardly toothed portion (26) by such distance, whereby there is eliminated such half locked or incomplete unlocked state of outwardly toothed portion (28) from the inwardly toothed portion (26). Then, the continuous upward rotation of operation lever (41) allows relative sliding displacement between the two sloped surfaces (40)(39) for all the respective three cam surfaces (38a) and cam engagement recessions (31). In particular, it is seen that the male lock member (30) is displaced along the longitudinal axis of shaft (12) under the biasing force of compression spring (S1) to positively cause the sloped side surface (39) of cam engagement recession (31) to slide along the mating sloped side surface (40) of cam surface (38a) in the arrow direction as shown in FIG. 6. As a result, all the three projected cam surfaces (38a) are engaged in all the three respective cam engagement recessions (31) as can be seen in FIG. 4. Thus, most of the male lock member (30) is retained within the housing (16), with the outwardly toothed portion (28) being completely disengaged from the inwardly toothed portion (26). At this point, the female lock plate (14) is released from the locked state and allowed to be rotated about the shaft (12), whereby the seat back (SB) may be inclined forwardly and backwardly with respect to the seat cushion (SB). Once a reclining angle of the seat back (SB) is determined, a user should release the operation lever (41), letting it to be lowered towards the non-use position as in FIG. 2, under the downward biasing force of spring (S2). This downward biasing action causes the rotary cam member (38) to rotate back about the shaft (12), forcing its three projected cam surfaces (38a) to slidingly climb up the mating sloped walls (39) of cam engagement recessions (31) and ride back on their respective home cam disengagement platforms (30a), which can be understood by looking reversely at FIGS. 6 to 5 and FIGS. 4 to 3. Therefore, the male lock member (30) is caused to move along the longitudinal axis of shaft (12) towards the male lock plate (14), against the biasing force of compression spring (S1), and retained in the locking position where the outwardly toothed portion (28) is in a full mesh engagement with the inwardly toothed portion (26), as shown in FIG. 3. In this way, the user can adjust and set a desired reclining angle of seat back (SB) with respect to the seat cushion (SC).

It is noted that the quick and positive disengagement between the outwardly and inwardly toothed portions (28) (26) is dependent upon the length (h) of the sheer areas (56)(56') respectively of cam enagement recessions (31) and cam surfaces (38a), and therefore, such length (h) should be determined appropriately, taking into account the depth of meshed engagement between those two toothed portions (28)(26) used.

In accordance with the present invention, the above-defined guide and actuation means for engagement and disengagement between the outwardly and inwardly toothed portions (28)(26) may be embodied alternatively in one of other second and third modes (110)(111) as shown in FIG. 7 and 8, for example. It should be understood that, except for the guide and actuation means to be set forth hereinafter, the whole construction of those two modes (110)(111) are identical to those of the above-described first mode (10), including such non-illustrated required peripheral elements as the arm and base plates (22)(24), operation lever (41), shaft (12), biasing spring (S2), spiral spring (50) and so forth as shown in FIG. 1, and thus, specific explanation is deleted on both illustrated and non-illustrated identical elements of the two modes (110)(111) to those of the first mode (10). Of course, all like designations to be used hereinafter correspond to all like designations given in the foregoing first mode (10) shown in FIGS. 1 to 6.

Namely, referring to the second mode (110) in FIG. 7, there is suggested such alternative mode of guide means wherein the three protuberant guide portions (32') and three mating guide recessions (34') may be provided, instead of the crosswise disposed four guide elements (32)(34) in the first mode (10). That is, the three protuberant guide portions (32') may be so formed on the side of male lock member (30) opposite to the outwardly toothed portion (28) as to be disposed apart from one another at the 120-degree interval relative to the hole (30b) and extend outwardly and radially therefrom. Also, instead of the crosswise disposed four guide recessions (34) in the first mode (10), the three guide recessions (34') may be formed in the base housing (16) such that they are disposed apart from one another at the 120-degree interval relative to the hole (16e) and extend outwardly and radially from the circumference of circular recessed room (16c).

Further, referring to FIG. 8, there is suggested such alternative mode of actuation means wherein four projected cam surfaces (38'a) and four mating cam engagement recessions (31') may be provided, instead of the three equidistant cam elements (38a)(31) in the first mode (10). That is, the four projected cam surfaces (38'a), all equal in height to one another, may be so formed on the disc-like rotary cam member (30) as to be disposed apart from one another at a 90-degree interval relative to the hole (30b), extending outwardly and radially therefrom. Also, instead of the three cam engagement recessions (31) in the first mode (10), the four cam engagement recessions (31'), all equal in depth to one another, may be formed in the side of the female lock member (30) where the four protuberant guide portions (32) are formed, as shown, such that they are disposed apart from one another at the 90-degree interval relative to the hole (30b), extending outwardly and radially therefrom. In this case, the formation of such four cam engagement recessions (31') in turn creates four equidistantly spaced-apart coplanar cam disengagement platforms (30') each alternating with the respective cam engagement recessions (31'), to thereby define an annular array of eight uniformly undulated cam follower regions with respect to the rotary cam member (38). Hence, in the present mode, the counterpart rotary cam member (38) may be formed with four projected cam surfaces (38'a) thereon, such that the cam surfaces (38'a) are disposed apart from one another at the 90-degree interval, each having a dimensions for slidable engagement into the respective four cam enagement recessions (31') mentioned above. As likewise in the first mode (10), each cam enagement recession (31') has a pair of outwardly divergent sloped side surfaces (39'), while each projected cam surface (38'a) has a pair of outwardly convergent sloped side surfaces (40'), with a view to facilitating the smooth rotational sliding of cam member (38) along the annular array of eight undulated cam follower regions (30'a) (31').

Accordingly, the second and third modes (110)(111) provide the same guiding and actuation effects as in the first mode (10): Namely, in assemblage, the male lock member (30) may be set in a predetermined position within the base housing (16) so that the female lock plate (14) may be easily assembled to the housing (16), with the outwardly toothed portion (28) thereof being fit meshed with the inwardly toothed portion (28) of male lock member (30), and further, in operation, the male lock member (30) may be stably guided in an non-rotational manner along the longitudinal axis of shaft (12) for error-free engagement and disengagement between the outwardly and inwardly toothed portions (28)(26).

Of course, in both of the second and third modes (110) (111), it should be understood, though not shown, that the same upper sheer area (56) as given in the first mode (10) is also formed in each projected cam surface (38a or 38'a) as well as in each boundary between the cam enagement recession (31 or 31') and cam disengagement platform (30a or 30'a), so as to attain an abrupt, complete disengagement of the outwardly toothed portion (28) from the inwardly toothed portion (26), as a means for preventing the incomplete unlocking (half locked) problem. Further, likewise in the first mode, a rounded corner (56a) may be formed between the cam engagement recession (31 or 31') and cam disengagement platform (30a or 30'a), and two rounded corners (56'a) be formed in each projected cam surface (38a), to attain smooth corners. Also, the boundary (56b or 56'b) between the sheer area (56 or 56') and sloped side surface (39, 39', 40 or 40') may be gently curved to provide a smooth continuous sloped surface.

In accordance with the present invention, it is appreciated that the teeth of both circular inwardly and outwardly toothed portions (26)(28) are meshed fully together, thus eliminating the need to increase the thickness of those teeth, and also permitting the teeth to be made small in pitch for fine adjustment of the reclining angle of the seat back (SB).

It is also appreciated that, by virtue of the above-explained guiding and actuation means (31, 32, 34, 38, 38a . . . ), in assemblage, the male lock member (30) can be easily positioned relative to the female lock plate (14) for correct meshed engagement between the inwardly and outwardly toothed portions (26)(28) that has been thought difficult in assembling this circular meshed engagement mechanism, and in operation, the male lock member (30) may be stably guided for disengagement of the outwardly toothed portion (28) from the inwardly toothed portion (26) without any incomplete unlocking or half-locked problem that may easily occur between the circular inwardly and outwardly toothed portions.

While having described the present invention thus far, it should be again understood that the invention is not limited to the illustrated embodiments, and any other modifications, replacements and additions may be structurally applied thereto without departing from the scopes of the appended claims. Naturally, it is free to adopt one of the first, second and third modes (10)(110)(111) or to combine them together appropriately, depending on design requirements, within the gist of the present invention.

What is claimed is:

1. A reclining device for a seat, comprising:

a shaft;

a base having a housing defined thereon, said shaft is rotatably inserted through said base housing, a female lock plate rotatably supported on said shaft with respect to said base housing, said female lock plate having an inwardly toothed portion of a generally circular configuration formed therein relative to a central axis of the shaft;

a male lock means having an outwardly toothed portion of a generally circular configuration formed toward a first side of said male lock means for a full meshed engagement with said inwardly toothed portion said female lock plate, said male lock means being so provided on said shaft so as to be rotatable thereabout and movable in a longitudinal direction thereof, wherein a second side of said male lock means is movably accommodated in said base housing;

a guide means defined between said base housing and said second side of said male lock means which is opposite to said first side;

said guide means including:

at least one protuberant guide portion which is formed on said second side of said male lock means; and at least one guide recession which is formed in base housing;

wherein said at least one protuberant guide portion is slidably fitted in said at least one guide recession, such as to permit non-rotational movement of said male lock means along the longitudinal direction of said shaft in a direction towards and away from said female lock plate, an operation lever integrally connected to said shaft; and an actuation means for causing said male lock means to move in the longitudinal direction of said shaft along said guide means so as to bring said outwardly toothed portion to and out of meshed engagement with said inwardly toothed portion, said actuation means including:

a cam means engaged to said shaft as to be rotatable together with said shaft within said base housing, said cam means having at least one projected cam surface thereon;

a cam follower means defined in said second side of said male lock means, said cam follower means having at least one engagement region and at least one disengagement region disposed with respect to said at least one projected cam surface of said cam means; and a biasing means for biasing said male lock means away from said female lock plate, wherein, when not in use, said at least one projected cam surface of said cam means is set at said at least one disengagement region of said cam follower means, whereby said male lock means is retained, while overcoming a biasing force of said biasing means, in a locked state where said outwardly toothed portion thereof is retained in a meshed engagement with said inwardly toothed portion of said female lock plate, and when in use, rotation of said operation lever of said operation lever causes said cam means to be rotated relative to the said cam follower means, thereby rotatively displacing said at least one projected cam surface towards and into engagement with said at least one engagement region of said cam follower means, whereby said male lock means is displaced under the biasing force of said biasing means along a longitudinal axis of said shaft in a direction away from said female lock plate so as to bring said outwardly toothed portion out of the meshed engagement with said inwardly toothed portion of said female lock plate.

2. The reclining device as defined in claim 1, wherein said inwardly and outwardly toothed portions are formed in a divergent frusto-conical shape and a convergent frusto-conical shape, respectively, in a mutually faced relation in respect to a longitudinal axis of said shaft.

3. The reclining device as defined in claim 1, wherein cam means has a plurality of projected cam surface disposed apart from one another at a predetermined interval relative to said shaft, and wherein said cam follower means comprises an array of cam follower regions which are defined by forming a plurality of said engagement regions and a plurality of said disengagement regions in an alternating relation with one another relative to said shaft, with such an arrangement that when not in use, said plurality of projected cam surfaces are respectively engaged in said plurality of engagement regions, whereas when in use, said cam means is caused by rotation of said operation lever to rotate with said shaft so as to engage said plurality of projected cam surfaces in said plurality of disengagement regions respectively, thereby displacing said male lock means away from said female lock plate to bring said outwardly toothed portion out of the meshed engagement with said inwardly toothed portion.

4. The reclining device as defined in claim 3, wherein each of said plurality of projected cam surfaces is formed with at least one sloped surface, and each of said plurality of engagement regions is also formed with at least one sloped surface, so as to facilitate ease with which said plurality of projected cam surfaces are engaged in and disengaged from the respective said plurality of engagement regions.

5. The reclining device as defined in claim 3, wherein between each of said plurality of projected cam surfaces and each of said plurality of engagement regions, there is provided a sheer portion for allowing abrupt sliding of said each of said plurality of projected cam surfaces along said each of said plurality of engagement regions, so as to insure that said inwardly toothed portion is brought completely out of the meshed engagement with said outwardly toothed portion.

6. The reclining device as defined in claim 5, wherein at least one rounded portion is formed adjacent to said sheer portion, so that said each of said plurality of projected cam surfaces is smoothly slid along said each of said plurality of engagement regions.

7. The reclining device as defined in claim 3, wherein said plurality of engagement regions comprise a plurality of cam engagement recessions and wherein said plurality of cam disengagement regions comprise a plurality of coplanar cam disengagement platforms, each alternating with the respective said plurality of cam engagement recessions.

8. The reclining device as defined in claim 3, wherein said plurality of projected cam surfaces comprise three projected cam surfaces which are formed apart from one another at 120-degree interval relative to said shaft, wherein said plurality of engagement regions comprise three cam enagement recessions which are formed at 120-degree interval from one another, and wherein said plurality of disengagement regions comprise three coplanar cam disengagement platforms, each alternating with the respective said three cam engagement recessions.

9. The reclining device as defined in claim 3, wherein said plurality of projected cam surfaces comprise four projected cam surfaces which are formed apart from one another at a 90-degree interval relative to said shaft, wherein said plurality of engagement regions comprise four cam engagement recessions which are formed at 90-degree interval from one another, and wherein said plurality of disengagement regions comprise four coplanar cam disengagement platforms, each alternating with the respective said four cam engagement recessions.

10. The reclining device as defined in claim 1, wherein said at least one protuberant guide portion comprises three protuberant guide portions which are so formed in said second side of said male lock means as to extend outwardly and radially relative to said shaft, and wherein said at least one guide recession comprises three guide recessions which are so formed in said base housing as to extend outwardly and radially relative to said shaft.

11. The reclining device as defined in claim 1, wherein said at least one protuberant guide portion comprises four protuberant guide portions which are so formed in said another side of said male lock means as to extend outwardly and radially relative to said shaft, and wherein said at least one guide recession comprises four guide recessions which are so formed in said base housing as to extend outwardly and radially relative to said shaft.

12. The reclining device as defined in claim 1, wherein said biasing means comprises a compression spring interposed between said male lock means and said female lock plate.

13. The reclining device as defined in claim 1, wherein said shaft is of a non-circular shape having a pair of arcuate surfaces and a pair of flat surfaces, and wherein all said base housing, female lock plate and male lock means include a circular hole in which said shaft is rotatably supported at the pair of arcuate surfaces thereof, except that said cam means has a non-circular hole generally conforming-to said non-circular shape of said shaft, whereby said cam means may only be rotated together with said shaft.

14. The reclining device as defined in claim 1, wherein a biasing spring is provided between said operation lever and a side of said base housing, so as to not only bias said operation lever towards a non-use position, but also so bias said cam means as to set at said disengagement regions, thereby retaining male lock means in a locked state where said outwardly toothed portion is retained in a meshed engagement with said inwardly toothed portion of said male lock plate.

* * * * *